United States Patent [19]
Coffey
[11] 3,974,088
[45] Aug. 10, 1976

[54] MOCK IODINE-125 RADIATION SOURCE

[75] Inventor: David L. Coffey, Oak Ridge, Tenn.
[73] Assignee: The Nucleus, Inc., Oak Ridge, Tenn.

[22] Filed: Sept. 19, 1974
[21] Appl. No.: 507,460

[52] U.S. Cl. .......... 252/301.1 R; 250/496
[51] Int. Cl.[2] .......... C09K 3/00
[58] Field of Search .......... 252/301.1 R; 250/496, 250/252, 304, 503

[56] References Cited
UNITED STATES PATENTS
2,831,122 4/1958 Brucer .......... 250/503

*Primary Examiner*—Leland A. Sebastian
*Assistant Examiner*—Deborah L. Kyle
*Attorney, Agent, or Firm*—Martin J. Skinner

[57] ABSTRACT

An intimate mixture of americium-241 and iodine-129 provides an energy spectrum that reliably simulates the spectrum of iodine-125 in a well-type detector. As such, it may be used as a long-lived standard to calibrate instruments such as well scintillation spectrometers in which measurements are to be made involving iodine-125.

7 Claims, 1 Drawing Figure

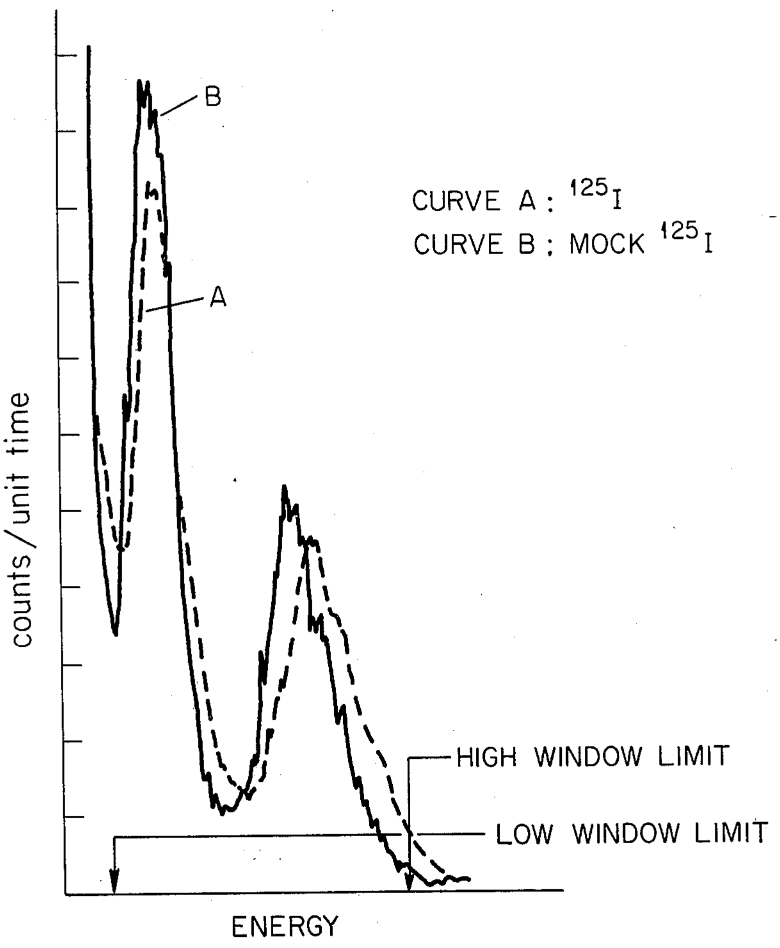
B
A
CURVE A : 125I
CURVE B : MOCK 125I
counts/unit time
HIGH WINDOW LIMIT
LOW WINDOW LIMIT
ENERGY

MOCK IODINE-125 RADIATION SOURCE

BACKGROUND OF THE INVENTION

The subject development relates generally to the field of radiochemistry and more particularly to an instrument calibration standard for applications employing iodine-125, such as radioimmunoassay.

Radioimmunoassay (RIA) combines the sensitivity of radiochemistry with the specificity of immunology to produce a unique new diagnostic and research tool. As such, it has become an important aspect of analyses performed in diagnostic laboratories. Typical of the analyses are those related to hormones, proteins, drugs (both therapeutic and addictive), poisons, metabolites and vitamins.

The basic principle of RIA utilizes the specific antigen-antibody reaction. A known amount of antibody, present as a limiting factor, is mixed with a sample containing the antigen to be tested and a known amount of radioactive antigen. After a suitable incubation time, an equilibrium mixture of labeled (radioactive) and unlabeled antigenantibody complex is formed. Since both endogenous and labeled antigen compete for the active sites of the antibody, the amount of labeled complex formed is a function of (inversely proportional to) the antigen concentration of the sample. More details about RIA principles may be found in a review article by D. S. Skelley, et al., in Clinical Chemistry, 19, 146 (1973).

A number of radioactive isotopes are potentially useful in RIA applications. These include tritium ($^{3}H$), iodine-131, iodine-125, carbon-14, cobalt-57, and cobalt-60. The two most common radioisotopes are $^{3}H$ and $^{125}I$ which are utilized in more than 90% of all commercially prepared RIA products. Of these, $^{125}I$ is now most often utilized.

As stated above, a determination of the labeled complex must be made in RIA. The measurement of this complex containing a gammaemitting isotope such as $^{125}I$ can be, and most often is, accomplished by transferring the sample into a tube which is placed in a cavity (well) in a scintillator crystal such as thallium-activated sodium iodide. The emissions from the isotope are thereby converted to light pulses which, in turn, are received by a photomultiplier tube to give rise to an electrical signal proportional to the energy absorbed from the radioactivity present in the sample. If the detecting unit is a spectrometertype instrument, the range of energy of specific interest may be studied. In the case of $^{125}I$, for example, this range is from about 0.017 MeV to about 0.075 MeV because of the x-ray emission at an energy of about 0.028 MeV, a $\gamma$-ray emission at an energy of about 0.035 MeV and (in a well counter) a sum coincidence peak at about 0.063 MeV. The two lower peaks of the spectrum normally are observed as a single broad peak well separated from the sum coincidence peak.

As in any radioactivity determination, periodic checking of the measuring equipment is necessary. For this purpose a "standard" is utilized to ascertain proper operation. In the case of $^{131}I$, where the half-life (time to decay to one-half of the activity) is eight days, a stand-in or "mock $^{131}I$" was developed having a very long half-life, as disclosed in U.S. Pat. No. 2,831,122. In the case of $^{125}I$, the iodine isotope $^{129}I$ has been utilized; however, this does not adequately ascertain all of the operating conditions of the instrumentation because the sum coincidence peak is missing.

BRIEF DESCRIPTION OF THE DRAWING

The single FIGURE illustrates a typical energy spectrum of $^{125}I$ as obtained using a well-type scintillation spectrometer and superimposed thereon the spectrum of a mock $^{125}I$ mixture described hereinafter.

SUMMARY OF THE INVENTION

Both of the peaks of the energy spectrum of $^{125}I$, as observed using a well-type scintillation spectrometer, are simulated by a mixture of radioisotopes, specifically a mixture of iodine-129 and americium-124. The $^{129}I$ emits a 0.040 MeV gamma ray and a 0.030 MeV xenon x-ray to simulate the broad lower energy peak of the $^{125}I$. The $^{241}Am$ emits a 0.060 MeV gamma ray to effectively simulate the sum coincidence peak of the $^{125}I$. A proportionate blend of the two radioisotopes thus provides a reference standard which closely simulates the $^{125}I$ and thus is denoted as "mock iodine-125."

DETAILED DESCRIPTION

Radioimmunoassay (RIA) is one of the relatively new applications of advancing medical technology. It is a highly useful diagnostic medical test used frequently to provide a physician, trying to manage and diagnose his patients' illness, with additional information of great importance concerning the measurement of many of the biochemical, pharmacological, and physiological body functions and interactions. The heart of the RIA system is the principle involved in the binding of an antibody to an antigen, the immune reaction.

The first of the essential reagents in this system-complex is the antibody. It is to this substance that the other two reagents — the labeled and the nonlabeled antigen — will bind. The antibody is secured through bleedings at set times over precise time periods using an animal host which has been periodically innoculated with a given immunogen. The serum component of these bleedings containing the antibodies is collected by physical means and used in the radioimmunoassay procedure.

The second of the essential reagents in radioimmunoassay is the antigen, both labeled and unlabeled. Since antigens are extremely potent elements in the living system, and since there is no way to measure the very minute levels of these antigens (down to one billionth of a gram or less) by standard chemical procedures, the objective is to "tag" or label a portion of the antigen which is to be measured with radioactivity for counting by a sensitive nuclear counter. In the presence of a fixed and limited amount of the antibody, there will occur competition between these two antigens (labeled and unlabeled) for attachment to the limited number of antibody sites. A sufficient incubation period is necessary to permit both the labeled and unlabeled antigens to compete for these binding sites on the antibody.

With a limited amount of antibody in the reaction mix, together with a known amount (not necessarily equal) of unlabeled antigen, there will be bound to the antibody molecules an amount of the original radioactive antigen present that is inversely proportional to the amount of the unlabeled antigen present. That is, as more unlabeled antigen is delivered in or found to be in the system containing a constant amount of radioactive antigen and a constant, limiting amount of antibody, less labeled antigen will attach to the antibody molecules since it is competing against a greater quantity of unlabeled antigen for attachment to antibody.

The third essential ingredient in the separation procedure is a charcoal adsorbent reagent. This charcoal reagent coated with dextran, for example, when introduced into the reaction mix at equilibrium time instantly adsorbs (through the dextran and onto the charcoal molecule) antigen molecules that were unable to bind onto antibodies because the antibody sites were already saturated. After centrifugation in a tube, all the charcoal appears at the bottom of a tube as a thick pellet because of the relative weight of the charcoal grains, while the supernatant fluid in the tube appears clear even though it contains antigenantibody complexes. Thus the separation of "free" from "bound" antigen (both labeled and unlabeled is realized. Then, both supernatant and charcoal pellet are separately counted in a nuclear counter, the radioactivity proportionate to each noted, and a % bound value calculated. Then, using an appropriate calibration curve, the quantity of the material under study in the patient's sample may be determined.

The radioisotope iodine-125 is currently utilized for the labeling of antigens in a large number of radioimmunoassay investigations. In many instances it is present as labeled antigen in reagent kits that are available for specific analyses. Typical of these kits are those distributed by Schwarz-Mann, Div. of Becton, Dickinson and Co., Orangeburg, N.Y. For example, $^{125}I$ is used in their kits to monitor digoxin, digitoxin, insulin, renin activity, human growth hormone, and human placental loctogen. Perhaps as many as 95 percent of the RIA applications utilize $^{125}I$.

Iodine-125 has a half-life of 60 days (in contrast to 8 days for iodine-131). It decays by electron capture giving rise to a 0.028 MeV x-ray, followed by the emission of a 0.035 MeV gamma ray. Furthermore, in a well-type scintillation detector as described below, there is produced a sum coincidence peak in the energy spectrum at about 0.063 MeV.

Accordingly, the most commonly utilized device for the measurement of the presence of $^{125}I$ is a well-type scintillation detector. Gamma radiation passes out of the sample (contained in preferably a plastic test tube, e.g., half inch diameter) which has been placed in the well and penetrates the aluminum canning to interact with the NaI scintillation crystal. This crystal is sealed to the photomultiplier tube (PMT) by means of transparent silicone grease or epoxy cement. The complete assembly is hermetically sealed and encased within the can. This unit is connected into the preamplifiers contained in the surrounding lead shield. Sodium iodide (NaI) acts as a scintillator giving rise to light (photons) which is directly proportional in energy and quantity to that of the nuclide present in the sample. The NaI photons are detected and amplified by the PMT. The pulse, as received from the PMT is usually only of the order of one millivolt and consequently must be greatly amplified to permit the analysis of the pulses as a function of height, the height being proportional to the energy of radiation entering the scintillator crystal. Usually discriminators are utilized to select a "window" or range of energy for study in order to eliminate extraneous radiations. Such measuring equipment is manufactured by several instrument companies; typical are Model 980-530 manufactured by Baird-Atomic, Inc., Bedford, Mass. and Model 1000 manufactured by The Nucleus, Inc., Oak Ridge, Tenn.

Referring now to the single FIGURE, Curve A is that obtained when a sample of iodine-125 is counted in the above-mentioned Nucleus Model 1000 well-type scintillation spectrometer. For this determination of the $^{125}I$ spectrum, a narrow window was scanned through the full energy spectrum. For routine counting, however, the discriminators are set at 0.017 MeV and 0.075 MeV. The peak at the left includes both the x-ray (~0.028 MeV) and the gamma ray (0.035 MeV), while the peak on the right is that of the sum coincidence peak (~0.063 MeV). The height of the peaks is proportional to the number of pulses of a given energy that are counted in a given time period. Thus, this height for fixed counting times is proportional to the quantity of $^{125}I$ in a sample assuming a uniform operation of counting equipment.

It is very important to the user of such a spectrometer to periodically check the instruments for proper calibration as actual counting conditions are subject to short- and long-term variations in PMT and amplifier gains. Such changes in gain may cause a shifting of the energy peaks outside the selected window and cause undesirable variations in the counting rate. A lower gain than normal produces a loss of counts from the low energy peak because they occur below the low window limit, and a higher gain brings about loss of counts that fall above the high window limit. Either of these shifts can occur; thus, both peaks must be generated to check the system. Although this check may be accomplished using iodine-125, the short half-life makes this very impractical due to the nonreproducibility of the count rate.

In order to periodically ascertain the performance of counting equipment, I have prepared a long-lived radioactive substance to substantially simulate the energy spectrum of $^{125}I$ in a well-type detector. This substance, referred to hereinafter as "mock $^{125}I$", exhibits a peak corresponding to the lower peak of $^{125}I$ as well as a peak corresponding to the higher energy (sum coincidence) peak. The lower energy peak of the mock $^{125}I$ is produced by iodine-129 which emits a 0.040 MeV gamma ray and a 0.030 MeV x-ray (xenon). The half-life of $^{129}I$ is about $16 \times 10^6$ years. The upper peak of the mock $^{125}I$ is produced by a second component, americium-241. This radioisotope, having a half-life of 458 years, emits a 0.060 MeV gamma ray. The resultant spectrum of mock $^{125}I$ is shown as Curve B of the FIGURE. This spectrum was also obtained using a Nucleus Model 1000 spectrometer.

I 99% the mock $^{125}I$ using the radioisotopes obtained from New England Nuclear, Boston, Mass. The iodine-129 is specified to have a radiochemical purity greater than 99and a specific activity of 0.17 micro Curie/mg of iodine. It is available as NaI in $Na_2SO_3$. The americium-241 likewise specified to have a radiochemical purity of greater than 99%; the specific activity is not stipulated by the supplier. It is available in 6 M $HNO_3$. It will be apparent that other sources of the radioisotopes may be used. After evaporating the $^{241}Am$-containing solution to dryness, taking care to avoid decomposition of the chemical forms, I mixed the powder with the $^{129}I$-containing solid so as to produce a mixture where there was about three parts (by activity) of $^{129}I$ to one part $^{241}Am$. About 0.1 microcurie of this mixture was placed in a 0.5 inch diameter plastic test tube for insertion in the spectrometer to obtain the above-described Curve B.

The 3:1 proportion, by activity, provides relative peak heights corresponding to those of real $^{125}$I. Although this is preferred, it is not essential and a range of 0.1:1 to 100:1 would be useful. There must be, however, sufficient of each component to provide a definite identifying peak in the spectrum.

In order to be used effectively as a routine standard, the mock $^{125}$I should be sealed from environmental effects. Accordingly, the powders may be mixed and pressed into pellets for insertion in a standard sized tube to fit within the spectrometer well. This pellet would be firmly affixed in the tube using, for example, an epoxy composition such as Shell 828, a product of Shell Oil Co. Alternatively, the mixed powders may be dispersed over the inner surface of the tube and likewise sealed with epoxy or similar cements. In still other embodiments, the radionuclides may be present in a suitable liquid or may be sorbed on suitable solids, e.g., charcoal or resin particles. In all of these embodiments, the two nuclides are substantially intimately mixed. While this is preferred, it is not essential. The choice of form of the source is made to provide a configuration and distribution closely resembling that of actual samples containing iodine-125 that are to be counted in the well-type detector. For additional safety, the tube containing the source, in any of the forms, may be permanently sealed at the top.

A typical counting procedure for any $^{125}$I-containing sample would first be preceded by the following steps using my invention. The mock iodine-125 source would be inserted in the well-type detector, e.g., the above-described scintillation spectrometer, and a standardized count taken and compared to previous counts. The gain of the instrument is then adjusted, if necessary, to re-establish the optimum conditions as indicated by a match between the counts and the previous value. Routine iodine-125 counting may then be made with confidence. The mock I-125 source should be used daily, or more frequently if unusual variations of temperature or line voltage suggest possible changes of instrument gain.

Although I have described the mock $^{125}$I as a calibration device for nuclear instrumentation, it will have additional applications in nuclear medicine. As such, it may be used as a "stand-in" for $^{125}$I in any application such as a synthetic human organ in the same fashion as mock $^{131}$I of U.S. Pat. No. 2,831,122. It has the advantage for all applications that no filters are necessary to adjust the energy spectrum to match that of the true radioisotope as in that prior art patent.

From the foregoing it may be seen that I have developed a longlived radioactive source whose radiations produce an energy spectrum substantially simulating that of iodine-125. This source, known as mock iodine-125, will have many uses as a reference standard for true $^{125}$I.

I claim:

1. A mock iodine-125 radiation source which comprises a combination of radionuclides comprising iodine-129 and americium-241, disposed in a radiation-transparent enclosure, whose combined emissions give rise to an energy spectrum measured in a well-type detector that substantially simulates the corresponding energy spectrum of iodine-125.

2. The source of claim 1 wherein the iodine-129 and americium-241 are present in an iodine to americium activity ratio of from about 0.1:1 to about 100:1, wherein the radionuclides have a radiochemical purity of greater than 99 percent.

3. The source of claim 2 wherein the iodine-129 and americium-241 are present in an iodine to americium activity ratio of about 3:1.

4. The source of claim 3 wherein the iodine-129 and americium-241 are present as intimately-mixed solids and are affixed within the enclosure.

5. The source of claim 3 wherein the iodine-129 and americium-241 are present in a liquid.

6. The source of claim 4 wherein the enclosure is a plastic test tube and the solids are dispersed on and sealed to the inner surface of the plastic test tube.

7. The source of claim 4 wherein the total activity of the solids is about 0.1 microcurie.

* * * * *